Nov. 27, 1956

G. C. JOYCE 2,771,716

GRINDING MACHINE – WORK LOADER

Filed Feb. 23, 1955

INVENTOR
GLOVER C. JOYCE
BY
Harold W. Eaton
ATTORNEY

Fig. 8

United States Patent Office 2,771,716
Patented Nov. 27, 1956

2,771,716

GRINDING MACHINE-WORK LOADER

Glover C. Joyce, Worcester, Mass., assignor to Norton Company, Worcester, Mass., a corporation of Massachusetts Application February 23, 1955, Serial No. 489,958

12 Claims. (Cl. 51—105)

This invention relates to machine tools, and more particularly to an automatic work loading, transferring and discharging apparatus for loading work pieces into a grinding machine and unloading finished ground work pieces therefrom.

One object of the invention is to provide a simple and thoroughly practical automatic actuating work loading, transferring, and discharging apparatus for crankpin grinding machines. Another object is to provide a work loading mechanism for picking up work pieces from a loading station and transferring them to a grinding station for a grinding operation and thereafter automatically transferring the work piece to an unloading station. Another object is to provide a work loading and transferring mechanism for a multiple station grinding machine simultaneously to pick up work pieces at a plurality of stations and to deposit a work piece to be ground in an intermediate station after which it is automatically transferred from the intermediate station into an operative position in the grinding machine. Another object of the invention is to provide a work loading and transferring mechanism for a grinding machine in which work loader heads deposit work pieces at an intermediate station for transfer into operative grinding position which is arranged so that the grinding station may be bypassed in case it is not functioning properly. A further object is to provide a manually operable control for each intermediate station whereby any intermediate station may be rendered inoperative in case it is necessary to shut-down the adjacent grinding station, thereby permitting crankshafts to by-pass a grinding station without interrupting the operation of the transfer mechanism and the remainder of the grinding stations.

Other objects will be in part obvious or in part pointed out hereinafter.

In the accompanying drawings in which is shown one of various possible embodiments of the mechanical features of the invention.

Figure 1:
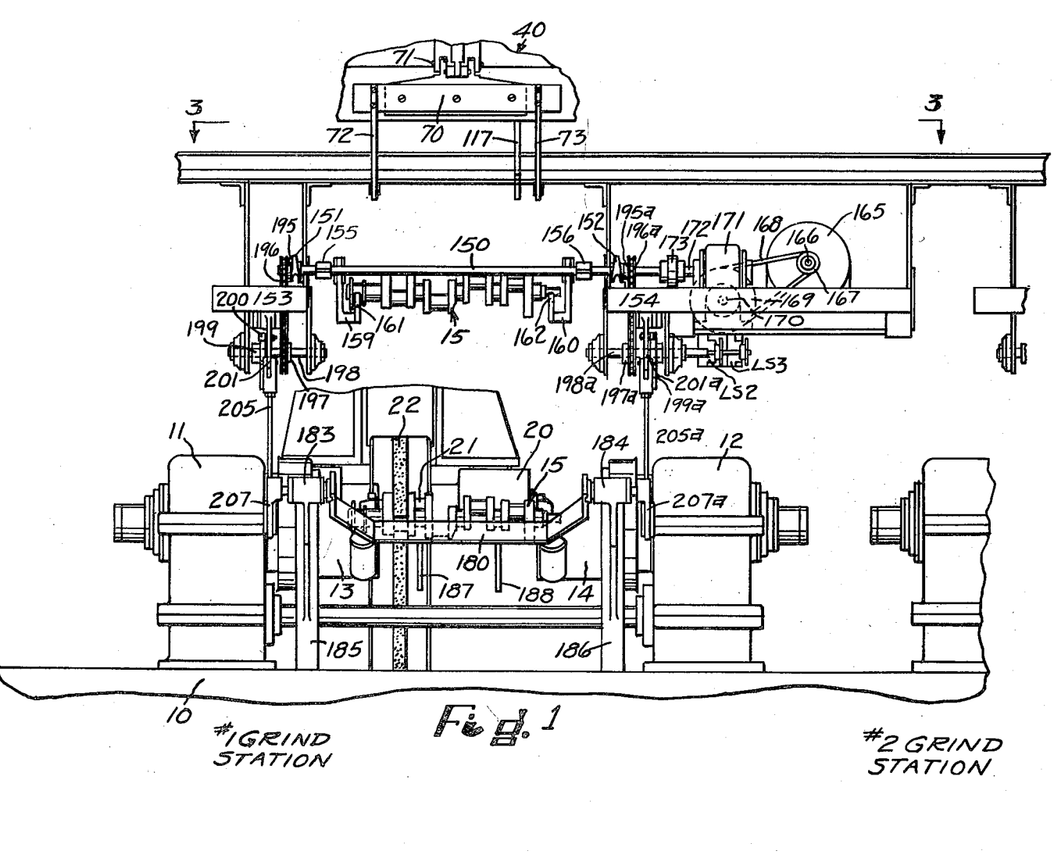
Fig. 1 is a fragmentary front elevation of a multiple station grinding machine embodying the invention.

A multiple grinding station crankpin grinding machine has been illustrated in the drawings comprising a base 10 which supports a plurality of pairs of spaced axially aligned work heads 11 and 12, only one station being illustrated in detail in Fig. 1. Each of the work heads 11 and 12 are provided with axially aligned rotatable pot chucks 13 and 14 for supporting the opposite ends of a crankshaft 15 during a grinding operation.

A transversely movable wheel slide 20 is provided at each of the grinding stations. Each of the wheel slides 20 is provided with a rotatable wheel spindle 21 suitably journalled in bearings (not shown) carried by the wheel slide 20. The wheel spindles 21 each supports a grinding wheel 22. A driving mechanism is provided for the wheel spindle 21 and the grinding wheel 22 comprising a motor (not shown) mounted on the upper surface of the wheel slide 20 in the conventional manner. The motor is connected by multiple V-belts 23 with a V groove pulley 24 mounted on the end of the wheel spindle 21 to facilitate imparting a rotary motion to the spindle 21 and the grinding wheel 20.

A feeding mechanism is provided for imparting a transverse feeding movement to the wheel slide 20 comprising a rotatable feed screw 25 which is rotatably supported by the base 10. The feed screw 25 meshes with or engages a feed nut 26 depending from the underside of the wheel slide 20. The left hand end of the feed screw 25 (Fig. 8) is slidably keyed within a rotatable sleeve 27 which is journalled in spaced anti-friction bearings 28 and 29. The sleeve 27 is provided with a gear 30 which meshes with a gear 31. The gear 31 is operatively connected in a conventional manner with a manually operable feed wheel 32 rotatably supported on the front of the machine base 10. The feeding mechanism as illustrated in the drawings is manually operated. A power operated wheel feeding mechanism may be employed such as for example that shown in the prior U. S. Patent No. 2,572,529 to H. A. Silven dated October 23, 1951, to which reference may be had for details of disclosure not contained herein.

Figure 8:
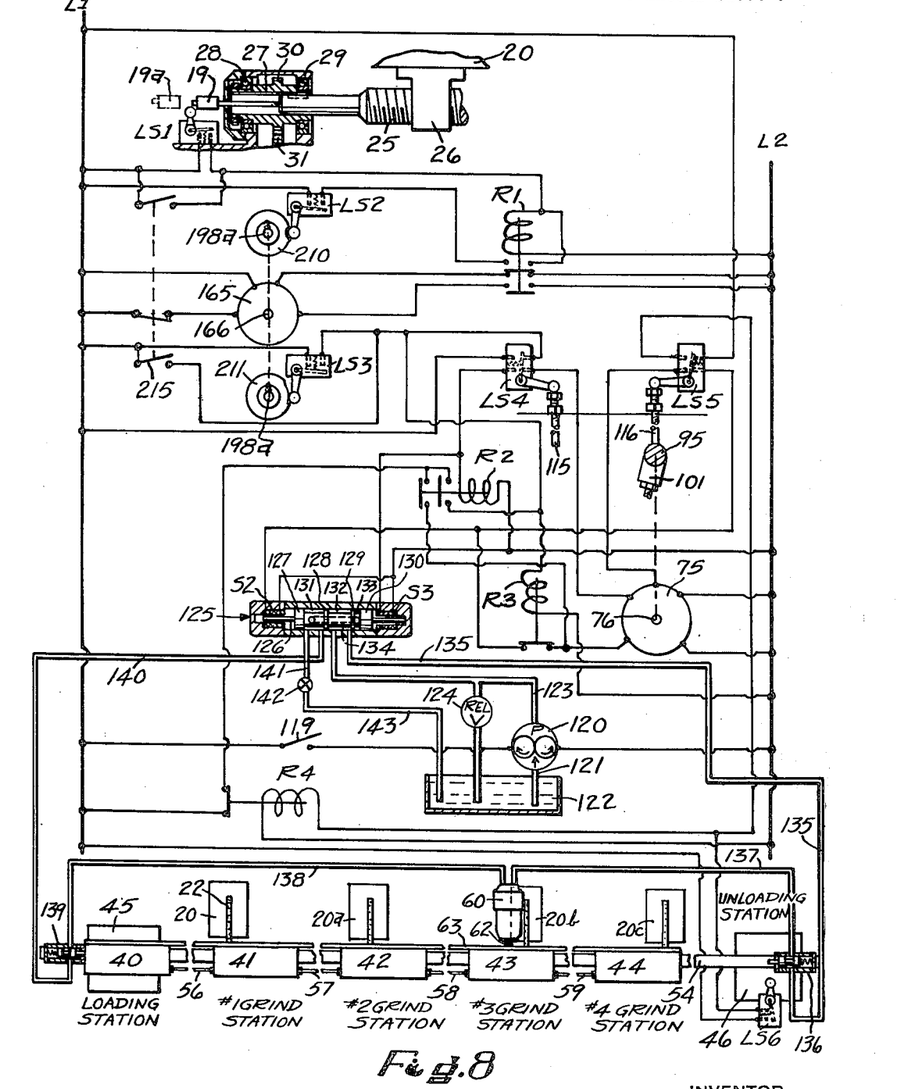
Fig. 8 is a combined hydraulic and electric diagram of the actuating mechanisms of the machine.

This invention is particularly applicable to a crankshaft grinding machine having a plurality of grinding stations as illustrated diagrammatically in Fig. 8. Grinding station No. 1 has been illustrated in Figs. 1 and 2. This same mechanism, namely, wheel slide 20 and grinding wheel 22 are duplicated at each of the grinding stations Nos. 2, 3, and 4. A crankshaft loading and transferring mechanism is provided comprising a plurality of work loader units 40, 41, 42, 43 and 44 all of which operate simultaneously to pick up crankshafts to be ground and to transfer them to the next station. The work loaders 40, 41, 42, 43 and 44 are all operatively connected so that they may be traversed longitudinally during a transfer operation. Loader unit 40 picks up a crankshaft from a loading station 45 (Fig. 8). Work loader 41 picks up a crankshaft at grinding station No. 1, work loader 42 picks up a crankshaft at grinding station No. 2, work loader 43 picks up a crankshaft at grinding station No. 3 and work loader 40 picks up a crankshaft at grinding station No. 4. The work loaders may then be traversed longitudinally so that work loader units 40, 41, 42 and 43 will deposit chankshafts to be ground at grinding stations Nos. 1, 2, 3 and 4 respectively, and work loader unit 44 will deposit a completely ground crankshaft on an unloading station 46. This arrangement of work loaders is substantially identical to that disclosed in the pending application of H. A. Silven and S. S. Mader, Serial No. 434,484,, filed June 4, 1954.

Figure 2:
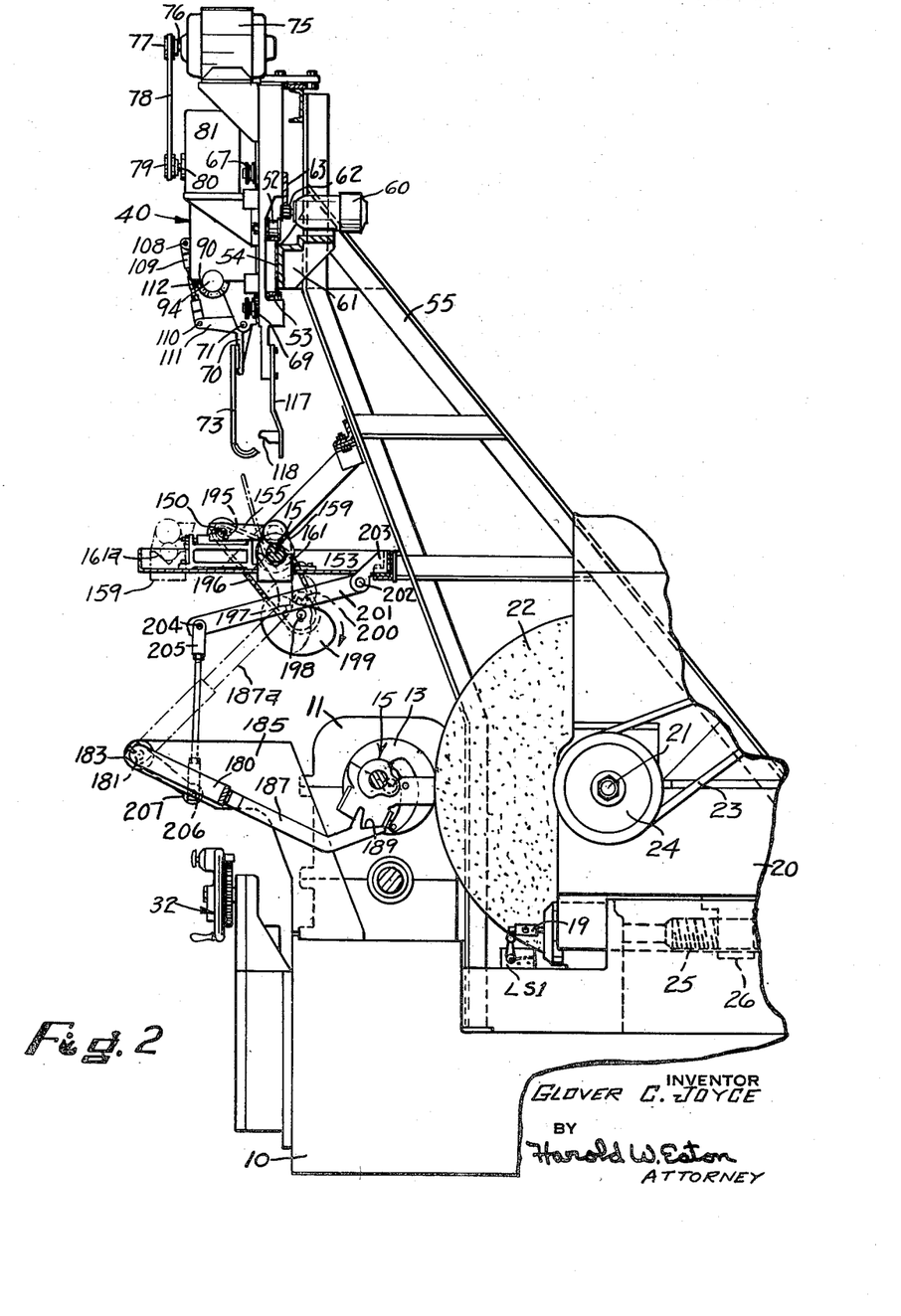
Fig. 2 is a fragmentary end elevation on an enlarged scale, of the grinding machine.
Figure 4:
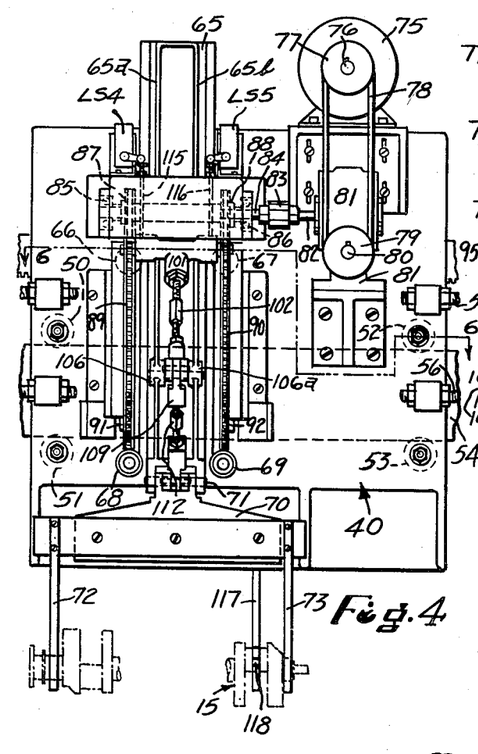
Fig. 4 is a front elevation, on an enlarged scale, of the work loader head.
Figure 5:
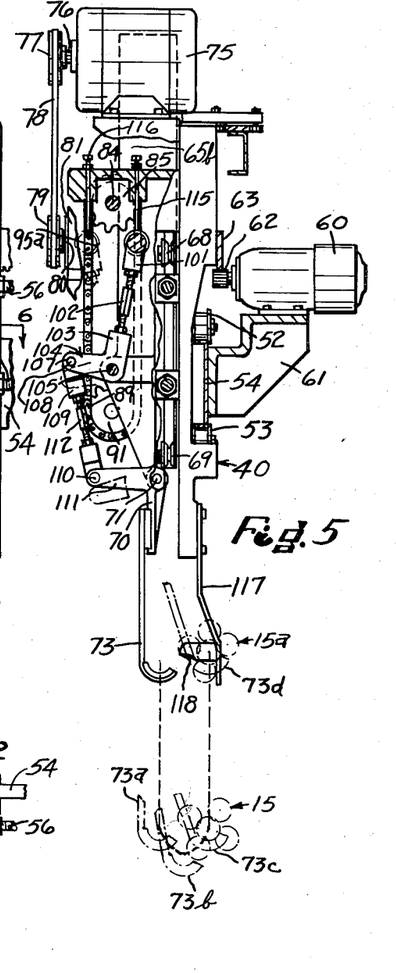
Fig. 5 is a right hand end elevation of the work loader head as shown in Fig. 4, having parts broken away and shown in section to more clearly show the construction.

The longitudinally traversable loader unit 40 has been illustrated in detail in Figs. 2, 4 and 5. The other work loaders 41, 42, 43 and 44 are identical in construction and consequently have not been illustrated in detail in the drawings. The loader unit 40 is provided with a plurality of spaced rollers 50—51 and 52—53 which ride upon the upper and lower surface of a channel iron 54. The channel iron 54 is supported by a plurality of brackets 55 which are fastened to the base 10. The channel iron 54 serves as a longitudinally extending guideway for supporting and guiding the work loader units during a longitudinally traversing movement. The work loader units are spaced from each other and operatively connected to each other by a plurality of pairs of connecting rods 56, 57, 58 and 59.

A traversing mechanism is provided for simultaneously traversing all of the work loader units longitudinally relative to the channel iron 54 which may comprise a fluid motor 60 supported on a bracket 61 which is fixedly mounted on the channel iron 50. The motor 60 is provided with a driven pinion 62 which meshes with a rack bar 63 supported by the work loader units. It will be readily apparent from the foregoing disclosure that a rotary motion imparted to the pinion 62 will transmit a longitudinal traversing movement to the work loader units 40—41—42—43—44.

The loader unit 40 is provided with a vertically movable slide 65 which is supported by a plurality of pairs of anti-friction rollers 66—67 and 68—69 which are in turn supported on the loader unit 40. The slide 65 is arranged to move in a vertical direction in a manner to be hereinafter described. The slide 65 is provided with a pair of spaced parallel ribs 65a and 65b which serve to support a slide actuating mechanism. A pivotally mounted support 70 is supported on a stud 71 carried by the ribs 65a and 65b on the vertical slide 65. The pivotally mounted support 70 is provided with a pair of spaced vertically arranged work engaging hooks 72 and 73 which are arranged to engage spaced main bearings on the crankshaft 15 to be ground.

A suitable mechanism is provided for moving the slide 65 vertically and also to swing the pivotally mounted member 70 together with hooks 72 and 73 to facilitate picking up a crankshaft 15 from the loading station 45, raising it, transferring it longitudinally, lowering it and depositing it at an intermediate station after which it is conveyed into supporting engagement with the pot chucks 13 and 14 respectively in a manner to be hereinafter described. This mechanism may comprise a motor driven mechanism comprising a reversible electric motor 75 mounted on the upper surface of the loader unit 40. The motor 75 is provided with a motor shaft 76 which supports a pulley 77. The pulley 77 is connected by a V-belt 78 with a pulley 79 mounted on a driveshaft 80 of a speed reducer unit 81. The speed reducer unit 81 may be any of the well known speed reducer units now on the market. The speed reducer unit 81 is provided with a driven shaft 82 which is connected by a coupling 83 with a rotatable shaft 84 which is journalled in spaced anti-friction bearings 85—86 carried by the loader unit 40. The shaft 84 is provided with a pair of spaced sprockets 87 and 88 which drive a pair of spaced link chains 89 and 90 respectively. The lower ends of the chains 89 and 90 wrap around a pair of spaced idler sprockets 91 and 92 respectively which are rotatably journalled in bearings 93 and 94 respectively carried by the loader unit 40. It will be readily apparent that rotary motion of the motor shaft 76 will be imparted through the mechanism just described to transmit motion to the link chains 89 and 90.

Figure 7:
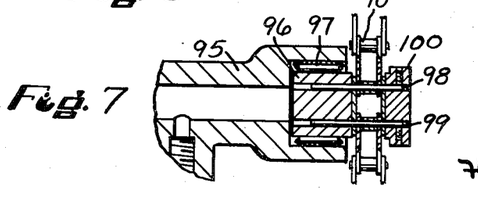
Fig. 7 is a fragmentary sectional view, on an enlarged scale, taken approximately on the line 7—7 of Fig. 6, showing the driving connection between the cross head and one of the link chains.

The links 89 and 90 are operatively connected in a manner to be hereinafter described to transmit a predetermined vertical movement to the slide 65 and also to impart a predetermined swinging movement to the member 70 and the work engaging hooks 72—73. A cross head 95 is connected at its opposite ends to the link chains 89 and 90 in a manner illustrated in Fig. 7. The cross head 95 rotatably supports a bushing 96 at opposite ends thereof in needle bearings 97. The bushing 96 is provided with a pair of spaced pins 98 and 99 which replace a pair of adjacent studs on the link chains 89 and 90. The pins 98 and 99 pass through a collar 100 which is secured thereon by a pair of set screws. The cross head 95 is provided with a downwardly extending arm 101 which is connected by a turnbuckle 102 with an upwardly extending arm 103 of a bell crank lever 104. The bell crank lever 104 is pivotally supported on a rock shaft 105 which is supported in projecting bosses 106 and 106a formed integral with the ribs 65a and 65b respectively on the vertically movable slide 65. A second arm 107 of the bell crank lever 104 is connected by a stud 108 with the upper end of a link 109. The lower end of the link 109 is connected by a stud 110 with an arm 111 formed integral with the pivotally mounted member 70. The link 109 is provided with a turnbuckle adjustment to facilitate varying the length of the link 109, that is, the distance between the studs 107 and the stud 110 so as to vary the position of the work engaging hooks 72—73 relative to the vertically movable slide 65. By manipulation of the turnbuckle 102, the slide 65 and the hooks 72—73 may be vertically adjusted as desired. By manipulation of the turnbuckle 112, the relative position of the pivoted member 70 together with the work engaging hooks 72—73 may be varied to facilitate setting up the work loading unit. The electric motor 75 is preferably a reversible motor so that the link chains 89 and 90 together with the cross head 95 may be moved in either a clockwise or counter-clockwise direction (Fig. 5). As shown in Fig. 5, the cross head 95 is shown in its uppermost position so that it raises a plunger 115 to actuate a limit switch LS4. When the motor 75 is started to actuate the loader hooks 72—73, the link chains 89—90 start moving in a clockwise direction (Fig. 5) so that the cross head 95 travels downwardly in a U-shaped path and passes around the idler sprockets 91—92 and then moves upwardly into a broken line position 95a (Fig. 5) in which position the cross head 95 causes an upward movement of a plunger 116 to actuate a limit switch LS5 (Fig. 4). During the downward movement of the cross head 95, a vertical movement is imparted to the vertical slide 65 to shift the loader hooks 72—73 downwardly into the position 73a (Fig. 5) in a substantially vertical path for the purpose of picking up a crankshaft to be ground from the loading station 45. At the time the loader hooks 72—73 reach position 73a, the cross head 95 is about to start its travel around the idler sprockets 91—92 and due to the linkage previously described causes the loader hooks 72—73 to swing in a counter-clockwise direction so as to move through position 73b into position 73c (Fig. 5) so that the hooks 72—73 engage spaced main bearings on a crankshaft 15. The cross head 95 then starts a vertical upward movement toward position 95a to raise the hooks 72—73 and the crankshaft 15 into position 73d and 15a, respectively (Fig. 5) so that it is ready for a longitudinal traversing movement to transfer the crankshaft either from the loading station into a grinding station or from a grinding station into the next grinding station or from a grinding station into an unloading station 46. A downwardly extending bracket 117 is fixedly mounted on the loader unit 40 (Figs. 4 and 5). The bracket 117 carries a cam 118 which is engaged by a crankpin on the crankshaft 15 as it moves upwardly into a transfer position to impart a rotary indexing movement to the crankshaft 15. This rotary indexing movement serves to facilitate positioning the crankpin to be ground so that when the crankshaft 15 is transferred and lowered into engagement, in a manner to be hereinafter described into the pot chucks 13—14, the crankpin to be ground is positioned for a grinding operation.

A hydraulic system is provided for supplying fluid under pressure for actuating the fluid motor 60 so as to traverse the work loader units 40—41—42—43—44 longitudinally. This mechanism may comprise a motor driven fluid pump 120 (Fig. 8) which draws fluid through a pipe 121 from a reservoir 122 and passes fluid under pressure through a pipe 123. A pressure relief valve 124 is provided in the pipe 123 to pass excess fluid under pressure directly to the reservoir 122 so as to maintain a substantially uniform operating pressure within the fluid system. A manually operable switch 119 is provided to facilitate starting and stopping the motor driven pump 120.

A piston type control valve 125 is provided for controlling the admission to and exhaust of fluid from the rotary-type fluid motor 60. The valve 125 is preferably a piston type valve having a slidably mounted valve member 126 having a plurality of spaced integral valve pistons 127, 128, 129 and 130 arranged to form a plurality of spaced valve chambers 131, 132 and 133. A central passage 134 extends longitudinally through the slidably mounted valve member 126 so as to connect the valve chamber 131 with the valve chamber 133. A solenoid S2 is provided which when energized shifts the slidably mounted valve member 126 toward the right. A solenoid S3 is provided which when energized serves to shift the valve member 126 toward the left. When the solenoid S2 is energized, as shown in Fig. 8, the valve member 126 moves toward the right so that fluid under pressure passing through the pipe 123 enters the valve chamber 132 and passes through a pipe 135, through a normally open slow-down throttle valve 136, through a pipe 137 to the motor 60 to start a longitudinal traversing movement of the work loader units 40—41—42—43—44 in one direction. During this movement fluid may exhaust from the motor 60 through a pipe 138, through a normally open slow-down valve 139, through a pipe 140 into the valve chamber 131 and exhausts through a pipe 141, through a throttle valve 142 and through a pipe 143 into the reservoir 122. The throttle valve 142 located between the pipes 141 and 143 serves to control the rate of exhaust of fluid from the motor 60 and thereby to control the rate of traversing movement of the work loader units 40—41—42—43—44.

Similarly when the solenoid S3 is energized, the valve member 126 is shifted toward the left so that fluid under pressure passing through the pipe 123 enters the valve chamber 132 and passes through the pipe 140, through the normally open slow-down valve 139, through the pipe 138 to start the fluid motor 60 to traverse the work loader units 40—41—42—43—44 in the reverse direction. During this latter movement, fluid may exhaust from the motor 60, through the pipe 137, through the normally open slow-down valve 136, through the pipe 135 into the valve chamber 133, through the central passage 134 into the valve chamber 131, through the pipe 141, through the throttle valve 142 and the exhaust pipe 143 into the reservoir 122.

In order to facilitate a rapid transfer of work pieces between stations, it is desirable to provide an intermediate loading station at each grinding station so that while a grinding operation is being carried out at the several grinding stations, new crankshafts 15 may be deposited in the intermediate station adjacent to and above the grinding position of the crankshaft 15. In such an arrangement the work loader units 40—41—42—43—44 are utilized to deposit crankshafts 15 simultaneously at each of the intermediate stations after which they are transferred into axial alignment with the pot chucks 13—14 by a mechanism to be hereinafter described.

Figure 3:
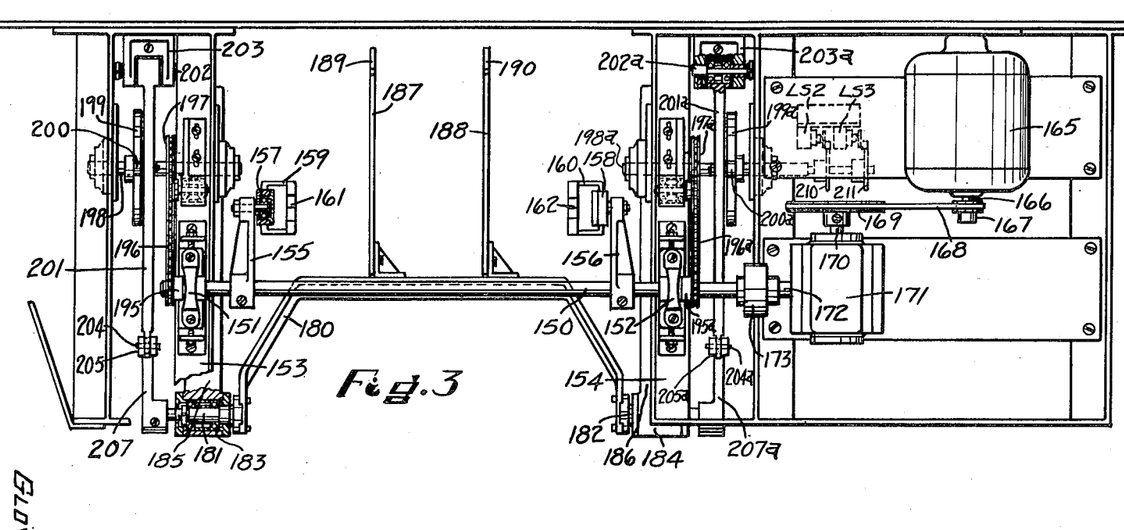
Fig. 3 is a fragmentary plan view, on an enlarged scale, taken approximately on the line 3—3 of Fig. 1, with the work loader hooks removed showing the intermediate loader station and the actuating mechanism therefor.

As illustrated in Figs. 1 and 3, a rotatable shaft 150 is journalled in spaced bearings 151 and 152 carried by rigid members 153 and 154 of the frame. The shaft 150 is provided with a pair of spaced arms 155 and 156 the outer end of which supports an anti-friction bearing 157 and 158 respectively. Arms 159 and 160 are supported by the outer members of the bearings 157 and 158 respectively and are provided at their lower ends with V-surfaces 161 and 162 respectively to receive and support the opposite ends of a crankshaft when deposited therein by loader hooks 72—73.

A suitable driving mechanism is provided for the shaft 150 comprising a motor 165 having a motor shaft 166 provided with a V-groove pulley 167. The pulley 167 is connected by a V-belt 168 with a V-groove pulley 169 mounted on a driveshaft 170 of a speed reducer unit 171. The speed reducer unit 171 may be any of the well known speed reducer units now on the market. The speed reducer unit 171 is provided with a driven shaft 172 which is axially aligned with the shaft 150 and is connected thereto by means of a coupling 173 (Fig. 3). The operation of the driving mechanism will be hereinafter described.

The electric motors 75 and 165 are a braking-type motor in which an auxiliary winding is superimposed on the conventional stator winding of a single phase or polyphase squirrel cage motor. The winding is arranged and distributed in a manner similar to a conventional two-phase winding. It is used only during the braking operation and is non inductive with respect to the stator winding so that no current is induced in it when the main running winding is energized. These motors may be any of the well known braking motors such as for example the Dinabrake motor manufactured by the Standard Dayton Corporation, of Dayton, Ohio, or the Unibrake motor manufactured by the Master Electric Company, of Dayon, Ohio, both of which are covered by U. S. Patent No. 2,627,059 to Samuel Noodleman, et al., dated January 27, 1953, to which reference may be had for details of disclosure not contained herein.

A transferring mechanism is provided for conveying crankshafts 15 from the intermediate station into axial alignment with the pot chucks 13 and 14. This mechanism may comprise a substantially U-shaped frame 180 (Figs. 1 and 3) which is supported at its opposite ends by a pair of axially aligned pivot shafts 181 and 182 journalled in bearings 183 and 184 carried by arms 185 and 186 respectively. The arms 185 and 186 are fixedly supported on the base 10. The U-shaped frame 180 is provided with a pair of spaced arms 187 and 188 each of which is provided with V-shaped supporting surfaces 189 and 190 respectively.

A suitable driving mechanism is provided for actuating the U-shaped frame 180 to swing the arms 187 and 188 in timed relation with the other parts of the loading mechanism. A sprocket 195 is mounted on the left hand end of the shaft 150 (Fig. 3). The sprocket 195 is connected by a link chain 196 with a sprocket 197 carried by a rotatable shaft 198. The shaft 198 serves as a support for a cam 199 (Figs. 2 and 3). A cam follower roller 200 is mounted on an arm 201. The arm 201 is pivotally supported by a stud 202 carried by a bracket 203 fastened to the frame of the machine. The other end of the arm 201 is connected by a stud 204 with the upper end of a substantially vertical link 205. The lower end of the link 205 is connected by a stud 206 with an arm 207 which is fixedly mounted on the pivot shaft 181.

A similar mechanism is provided for imparting synchronous motion to the other end of the U-shaped frame 180. A sprocket 195a is mounted on the shaft 150 and is connected by a link chain 196a with a sprocket 197a mounted on a rotatable shaft 198a. The shaft 198a is provided with a cam 199a. A follower roller 200a is supported by an arm 201a which is pivotally mounted by a stud 202a. The stud 202a is carried by a bracket 203a which is in turn fixedly mounted on the frame of the machine. The other end of the arm 201a is connected by a stud 204a with a substantially vertical link 205a, the lower end of which is connected by a stud 206a with an arm 207a fixedly mounted on the pivot shaft 182. The sprockets 195 and 197 are of a 2 to 1 ratio so that the shaft 150 makes two complete rotations for each rotation of the cam 199. The sprockets 195a and 197a are also of a 2 to 1 ratio. It will be readily apparent from the foregoing disclosure that power from the motor 165 will be imparted through the mechanism above described to rotate the shaft 150 two complete rotations and at the same time to rotate the cams 199 and 199a through one complete rotation so that the arms 187—188 swing from the full line positions (Fig. 2) into a broken line position 187a to facilitate lifting a crankshaft 15 out of the pot chucks 13—14 and raising it to an intermediate station so that it may be picked up by the loader hooks 72—73. The shaft 198a is provided with a pair of spaced cams 210—211 which are engaged to actuate a pair of limit switches LS2 and LS3 respectively.

The combined operation of the holder units 40—41—42—43—44 is as follows: The loader hooks 72—73 pick up a crankshaft 15 and deposit it in the V-surfaces 161—162 of the intermediate station. The motor 165 is started after all of the crankpins at grinding stations Nos. 1, 2, 3 and 4 have been ground. The starting of the motor 165 serves through the mechanism above described to start rotation of the shaft 150 in a clockwise direction (Fig. 2) so that the V-surfaces 161—162 move the crankshaft 15 in a clockwise direction into broken line position 161a. At the same time through the link chain 196, the cams 199 and 199a rotate in a clockwise direction so that the arms 187—188 swing in a counterclockwise direction (Fig. 2) moving the V-surfaces 189—190 into engagement with main bearings of the crankshaft 15 and swing the arms into the broken line position indicated by 187a so that the ground crankshaft is in position so that on the next downward movement of the loader hooks 72—73 move into engagement with the main bearings of the crankshaft 15 and raise it vertically into a transfer position. Continued rotation of the shaft 150 in a clockwise direction shifts the arms 155—156 so that the crankshaft carried by the V-surfaces 161—162 will be deposited in the V-surfaces 189—190 on the arms 187—188. Continued rotation of the cam 199 swings the arms 187—188 in a clockwise direction from the broken line position 187a (Fig. 2) into the full line position 187 to deposit the crankshaft 15 in the pot chucks 13—14 for the next grinding operation.

Figure 6:
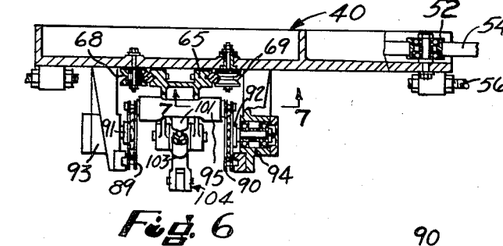
Fig. 6 is a horizontal sectional view, taken approximately on the line 6—6 of Fig. 4, through the work loader head.

This intermediate station is duplicated at each of the grinding stations. Each of these mechanisms at grinding stations Nos. 2, 3 and 4 is identical with that just described, consequently they have not been illustrated in detail. This multiple station crankpin grinding machine may be substantially identical with that shown in the pending application to H. A. Silven and S. S. Mader, Ser. No. 434,484, filed June 4, 1954, to which reference may be had for details of disclosure not contained herein. A single fluid motor 60 and solenoid actuated control valve 125 is provided for automatically traversing the work loaders 40—41—42—43—44. Each of the work loaders are provided with actuating mechanisms for the loader hooks 72—73 which are identical with that shown in Figs. 4, 5 and 6. Each of the wheel feeding mechanisms is provided with an adjustable sleeve 19 which is fastened to and supporting by the feed screw 25. This sleeve is arranged in the path of the actuating roller of a normally open limit switch LS1. During the rearward movement of the wheel slide 20, the sleeve 19 moving from the forward position 19a (Fig. 8) to position 19 engages and momentarily closes the limit switch LS1. There is a limit switch LS1 at each of the grinding stations, all of which are connected in series.

Assuming the machine to have been previously set up and all adjustments made and that there is a crankshaft 15 located in the pot chucks 13—14 at each of the grinding stations, and that the loaders 40—41—42—43—44 have deposited a crankshaft at each of the intermediate stations and a completely ground shaft at the unloading station 46, the loaders then return to the extreme left hand position ready to pick up a new shaft from the loading station 45 and from all the intermediate stations at the grinding stations Nos. 1, 2, 3 and 4. When the grinding cycle at each of the grinding stations times-out all of the wheel slides 20, 20a, 20b and 20c move rearwardly to inoperative positions during which movement the sleeves 19 momentarily close all of the limit switches LS1 thereby energizing a relay switch R1 which breaks a circuit thereby releasing the brake on the motor 165 and starts the motor 165 on each of the intermediate stations. The motor 165 actuates the intermediate arms and also the cams 210 and 211 which operate limit switches LS2 and LS3 respectively. As soon as the cam 210 starts rotating, the limit switch LS2 closes so as to set up a holding circuit for relay switch R1 which keeps the motor 165 energized. Shortly after the starting of the motor 165, the cam 211 closes the limit switch LS3 to release the brake on the work loader motor 75 held by the normally open contacts of LS5 and starts the motor 75 through the normally closed contacts of LS4.

When the motors 75 are set in motion, the loader hooks 72—73 descend through a substantially U-shaped path as above described to pick up a new crankshaft from the loading station 45 and a ground shaft from the arms 187—188 at each of the intermediate stations. The shaft 150 continues its rotary motion and due to the chain and sprocket connections makes two rotations to each rotation of the shaft 198a and the cam 199. The loader hooks 72—73 move upwardly with the crank shaft 15 just ground so that they are ready for the next transfer operation of the loaders 40—41—42—43—44. The arms 155—156 at each of the intermediate stations continue revolving until crankshafts supported by the V-surfaces 161—162 are deposited in the V-surfaces 189—190 of the arms 187—188 after which the cam 199 causes the arms 187—188 to swing in a clockwise direction from the broken line position 187a into the full line position 187 (Fig. 2) to deposit crankshafts in the pot chucks 13—14 at each of the grinding stations.

After the arms 155—156 deposit a crankshaft 15 in the V-surfaces 189—190 of the arms 187—188, the shaft 150 continues rotating in a clockwise direction until the arms 155—156 return to the full line position as indicated in Fig. 2 with the V-surfaces 161—162 being positioned to receive the next crankshaft 15 from the loader hooks 72—73. During the two complete rotations of the shaft 150, the shafts 198 and 198a rotate through one complete rotation only. After one complete rotation of the shaft 198a, the cam 210 allows the limit switch LS2 to open thereby breaking the circuit to deenergize the relay switch R1, closing the intermediate contactors of the switch R1 so as to supply current to brake and stop the motor 165. At the same time the cam 211 after completing one rotation allows the limit switch LS3 to open thereby breaking a circuit to deenergize relay switch R3, but the braking action cannot be applied to the loader motors 75 because the normally open contactors of the limit switch LS5 open when the cross head 95 starts its downward movement and the normally closed contactors thereof close.

When the loader hooks 72—73 complete a U-shaped path of movement, the cross head 95 causes an upward movement of the plunger 115 to open the normally closed contacts of the limit switch LS4 breaking the circuit to the motors 75 and the normally open contacts of the limit switch LS4 close to energize the relay switches R2 and R3. The energization of switches R2 and R3 make a circuit to apply a braking action to stop the motors 75. The closing of a circuit to energize a relay switch R2 also causes a circuit to energize the solenoid S3 thereby passing fluid under pressure through the pipe 140, the deceleration valve 139, the pipe 138 to start the fluid motor 60 so as to traverse the loader units 40—41—42—43—44 toward the right. As the loaders approach the right hand end of their stroke, the loader 44 engages the actuating plunger of the deceleration valve 136 to gradually cut-off the exhaust of fluid from the pipe 137 into the pipe 135 thereby slowing down and stopping the traversing movement of the loaders when they reach their extreme right hand end position.

When the loaders stop in their right hand end position, the loader 44 actuates the normally open limit switch LS6 to close the contactors thereof so as to energize a relay switch R4 which breaks a circuit to deenergize the relay switches R2 and R3 so as to break the circuit and brake the motors 75. The deenergizing of the relay switches R2 and R3 also serves to start the motors 75 in the reverse direction due to the fact that the normally closed contacts of the limit switch LS5 are now closed.

As soon as the loader hooks 72—73 start their downward movement, the normally open contacts of the limit switch LS4 open and the normally closed contacts thereof close. The loader hooks 72—73 move through a substantially U-shaped path and deposit crankshafts 15 at each of the intermediate stations above grinding stations Nos. 1, 2, 3 and 4 and also deposits a complete, ground crankshaft on the unloading station 46. The loader hooks 72—73 upon completion of the U-shaped path move so that the cross head 95 moves the plunger 116 upwardly to actuate the limit switch LS5 thereby opening the normally closed contacts thereof to stop the loader motor 75 and the normally open contacts of the limit switch LS5 close to apply a braking action to the motors 75 through the contacts of the relay switch R3. This actuation of the limit switch LS5 serves to complete a circuit to energize the solenoid S2 thereby shifting the valve 125 into the position illustrated in Fig. 8 so as to pass fluid under pressure through the pipe 135, the deceleration valve 136, the pipe 137 to the fluid motor 60 to traverse all of the loader units 40—41—42—43—44 toward the left. As the loaders move toward the left, the loader 44 moves away from the actuating roller of the limit switch LS6 thereby breaking a circuit to deenergize the relay switch R4. The loaders continue their movement toward the left until the loader 40 engages the actuating plunger of the deceleration valve 139 which serves to gradually slow down and stop the traversing movement of the loaders toward the left. The loaders are now in position for the next pick-up cycle.

In case it becomes necessary to shut down any one of the grinding stations Nos. 1, 2, 3 or 4, it is desirable to render the intermediate station adjacent to the disabled grinding station inoperative temporarily while repairs or adjustments are made. This is preferably accomplished by provision of a manually operable switch 215 on each of the intermediate loader units which when closed render the limit switch LS3 inoperative thereby preventing starting of the motor 165. In case any intermediate station is rendered inoperative, the station as far as grinding is concerned is by-passed. The loader hooks will deposit a crankshaft in the V-surfaces 161—162 where the shaft remains without ever being transferred to the pot chucks 13—14. On the next pick up movement of the loader hooks 72—73, the crankshaft supported in the V-surfaces 161—162 of the disabled intermediate station is picked up and later transferred to the next station. If any one of the intermediate stations is rendered inoperative the crankshafts will be automatically advanced through the machine and all of the pins except the pin which should have been ground on the disabled station are ground to the desired and predetermined extent. It is then necessary for the shafts to be removed from the unloading station and the unground crankpin ground on a standard crankpin grinder.

It will thus be seen that there has been provided by this invention apparatus in which the various objects hereinabove set forth together with many thoroughly practical advantages are successfully achieved. As many possible embodiments may be made of the above invention and as many changes might be made in the embodiments above set forth, it is to be understood that all matter hereinbefore set forth or shown in the accompanying drawings is to be interpreted as illustrative and not in a limiting sense.

I claim:

1. In a crankshaft grinding machine having a base, a transversely movable rotatable grinding wheel thereon, a pair of spaced axially aligned rotatable pot chucks for supporting the opposite ends of a crankshaft to be ground, means synchronously to rotate said pot chucks a work loading and a work unloading station, and a work loading and transferring mechanism therefor including an intermediate loading station located above the pot chucks having spaced revolvable V-shaped supporting members for supporting opposite ends of a crankshaft, a longitudinally movable work loader unit including a pair of spaced work engaging hooks which are movable through a substantially U-shaped path to facilitate picking-up a crankshaft to be ground from the loading station and depositing it in the intermediate station, means including a pair of spaced pivotally mounted work loader arms to pick up a ground crankshaft from the pot chucks and swing it into axial alignment with the intermediate station, said work engaging hooks being arranged to pick up a ground shaft from said arms and to transfer it to said unloading station, and means to revolve the V-shaped supporting members of the intermediate station in timed relation with the movement of said arms so as to deposit a new crankshaft on said arms after which said arms swing to deposit said crankshaft into supporting engagement with said pot chucks.

2. In a crankshaft grinding machine having a base, a transversely movable rotatable grinding wheel, a pair of spaced axially aligned rotatable pot chucks on said base for supporting the opposite ends of a crankshaft to be ground, means synchronously to rotate said pot chucks, a work loading and an unloading station, and a work loading and transferring mechanism therefor including an intermediate loading station supported on said base and located above the pot chucks having spaced revolvable V-shaped supporting members for supporting opposite ends of a crankshaft, means including a motor to actuate said members, a longitudinally movable work loader unit including a pair of spaced work engaging hooks, means including a motor on said unit to move said hooks through a substantially U-shaped path to facilitate picking-up a crankshaft from the loading station and depositing it in the intermediate station, and means including a pair of spaced pivotally mounted loader arms, means including a cam driven by said first motor to swing said arms to pick up a ground crankshaft from the pot chucks and to swing it into alignment with the intermediate station, said work engaging hooks being arranged to pick up a ground shaft from said arms and to transfer it to said unloading station, said cam serving to revolve said intermediate station in timed relation with movement of said arms so as to deposit a crankshaft to be ground on said arms after which said arms swing to deposit said crankshaft into supporting engagement with said pot chucks.

3. In a crankshaft grinding machine having a base, a grinding station including a transversely movable rotatable grinding wheel on said base and a pair of spaced axially aligned rotatable pot chucks on said base for supporting the opposite ends of a crankshaft to be ground, a work loading and unloading station, and a work loading and transferring mechanism therefor on said base including an intermediate loading station located on the grinding station above said pot chucks to support a crankshaft, means including a work loader arm for conveying a ground crankshaft from the pot chucks into a position aligned with the intermediate station, and to convey a crankshaft to be ground from the intermediate station to said pot chucks, and means including a work loader unit having a pair of spaced work engaging hooks which are movable through a substantially U-shaped path to facilitate depositing a crankshaft to be ground in the intermediate station and to facilitate picking-up a ground crankshaft from the loader arms after a grinding operation has been completed.

4. In a crankshaft grinding machine having a base, a grinding station including a transversely movable rotatable grinding wheel and a pair of spaced axially aligned rotatable pot chucks for supporting the opposite ends of a crankshaft to be ground, a work loading and an unloading station, and a work loading and transferring mechanism on said base including an intermediate loading station located above the pot chucks to support a crankshaft, means including a work loader arm for conveying a ground crankshaft from the pot chucks into a position aligned with the intermediate station, and to convey a crankshaft to be ground from the intermediate station to the pot chucks, means including a plurality of spaced work loader units each having a pair of spaced work engaging hooks, means including a motor on each of said units to move said hooks through a substantially U-shaped path to facilitate depositing a crankshaft to be ground at the intermediate station and to facilitate picking-up a ground crankshaft from the loader arms after a grinding operation has been completed, and means including a motor simultaneously to traverse said loader units longitudinally to transfer crankshafts from the loading station to the grinding station and from the grinding station to the unloading station.

5. In a crankshaft grinding machine as claimed in claim 4, in combination with the parts and features therein specified in which the intermediate loading station includes a pair of spaced revolvable V-shaped supporting members for supporting opposite ends of a crankshaft, means including a motor to revolve said members, a pair of spaced pivotally mounted work loader arms each having V-shaped work supporting surfaces, and means including a cam driven by said latter motor for actuating said arms to convey a ground crankshaft from the pot chucks into alignment with said intermediate station where it is picked up by the work engaging hooks and raised to a transfer position, said motor serving to revolve said V-shaped supporting members to transfer a crankshaft to be ground from the intermediate station onto said V-shaped supporting surfaces after which the arms are moved to swing the crankshaft to be ground into supporting engagement with the pot chucks.

6. In a crankshaft grinding machine as claimed in claim 5, in combination with the parts and features therein specified in which a limit switch is actuated by and in timed relation with the transverse movement of the grinding wheel to energize said first motor to actuate the intermediate station, means including a cam driven by said motor to actuate said loader arms, and means including a limit switch actuated by and in timed relation with the first motor to energize said second motor so as to start a loading cycle of the work loader hooks.

7. In a crankshaft grinding machine having a base, a loading station, a plurality of spaced grinding stations, one grinding station for each portion of the work piece to be ground, an unloading station, a pair of spaced axially aligned rotatable work supporting chucks on said base at each of said grinding stations, a transversely movable rotatable grinding wheel on said base at each of said grinding stations, a feeding mechanism to move each of said wheels transversely in either direction, and a work loading and transferring mechanism for transferring work pieces between stations including a longitudinally extending slideway, a plurality of spaced longitudinally work loader units on said slideway, means including a motor simultaneously to traverse said loader units longitudinally, a pair of spaced work engaging hooks on each of said loader units, means including a reversible motor on each of said units for moving said hooks through a substantially U-shaped path in either direction, a revolvable intermediate station having spaced supports for a crankshaft located on each of said grinding stations above said pot chucks to support a crankshaft before grinding, said loader hooks serving to deposit a crankshaft on each of said intermediate loader stations during a grinding operation, and means including a pivotally mounted loader arm on each of said grinding stations arranged to convey a ground crankshaft from the pot chucks into the path of movement of said loader hooks for picking-up a ground crankshaft, and to convey a crankshaft to be ground from each of the intermediate stations to said pot chucks.

8. In a crankshaft grinding machine, as claimed in claim 7, in combination with the parts and features therein specified of an independent motor to actuate each of said intermediate stations, and an independent switch to render any of said motors inoperative to facilitate by-passing a grinding station which is inoperative during adjustment thereof.

9. In a crankshaft grinding machine as claimed in claim 7, in combination with the parts and features therein specified in which each of the intermediate loading stations includes a rotatable shaft, a pair of spaced arms thereon, a V-shaped support rotatably supported on each of said arms, and means including a motor to rotate said shaft so as to revolve said V-shaped supports to facilitate loading crankshafts into the loader arms.

10. In a crankshaft grinding machine, as claimed in claim 7, in combination with the parts and features therein specified in which each of the intermediate loading stations includes a rotatable shaft, a pair of spaced arms thereon, a pair of V-blocks rotatably supported adjacent to the ends of said arms for supporting the opposite ends of a crankshaft, means including a motor to rotate each of said shafts to facilitate a loading operation, and means including an independent switch to render the motor inoperative so that a grinding station may be by-passed while it is shut down for adjustment or repair.

11. In a crankshaft grinding machine, as claimed in claim 7, in combination with the parts and features therein specified of a limit switch actuated by and in timed relation with the transverse movement of the grinding wheel when it moves to an inoperative position to start the intermediate station driving motor to swing said loader arms to pick up a ground crankshaft from the pot chucks and to raise it into the path of movement of said hooks, and means including a limit switch actuated by and in timed relation with the starting of said motor to energize said loader unit motor so that the loader hooks move through a U-shaped path to pick up a ground crankshaft from said loader arms.

12. In a crankshaft grinding machine, as claimed in claim 7, in combination with the parts and features therein specified of a limit switch actuated by and in timed relation with the transverse movement of the grinding wheel when it moves to an inoperative position to start the intermediate station driving motor so as to swing the loader arms to pick up a crankshaft from the pot chucks and to raise it into the path of movement of said hooks, a cam driven by said motor, and means including a limit switch actuated by said cam to start the loader unit driving motor so that the loader hooks move through a U-shaped path to pick up a ground crankshaft from the loader arms.

References Cited in the file of this patent

UNITED STATES PATENTS

| | | |
|---|---|---|
| 577,492 | Nash | Feb. 23, 1897 |
| 2,570,660 | Gamble | Oct. 9, 1951 |
| 2,623,429 | Meyer | Dec. 30, 1952 |
| 2,653,502 | Meyer | Sept. 29, 1953 |
| 2,704,955 | Kendall | Mar. 29, 1955 |